(12) United States Patent
Ouyang et al.

(10) Patent No.: US 12,235,839 B2
(45) Date of Patent: Feb. 25, 2025

(54) PROCESSING CORRELATED CALCULATED FIELDS IN CORRELATED SUBQUERIES

(71) Applicant: SAP SE, Walldorf (DE)

(72) Inventors: Yinghua Ouyang, Xi'an (CN); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 17/983,589

(22) Filed: Nov. 9, 2022

(65) Prior Publication Data

US 2024/0152513 A1 May 9, 2024

(51) Int. Cl.
*G06F 16/24* (2019.01)
*G06F 16/242* (2019.01)
*G06F 16/2453* (2019.01)

(52) U.S. Cl.
CPC ...... *G06F 16/24535* (2019.01); *G06F 16/244* (2019.01)

(58) Field of Classification Search
None
See application file for complete search history.

(56) References Cited

U.S. PATENT DOCUMENTS

| | | | |
|---|---|---|---|
| 8,521,723 B1 * | 8/2013 | Ahmed | G06F 16/24534 707/802 |
| 9,665,619 B1 * | 5/2017 | Cole | G06F 16/2453 |
| 10,102,248 B2 * | 10/2018 | Kang | G06F 16/24535 |
| 10,545,984 B2 | 1/2020 | Zhang et al. | |
| 11,061,927 B2 | 7/2021 | Ouyang et al. | |
| 11,379,477 B2 | 7/2022 | Ouyang et al. | |
| 11,423,024 B2 | 8/2022 | Ouyang et al. | |
| 11,429,610 B2 | 8/2022 | Cheng et al. | |
| 2004/0153448 A1 * | 8/2004 | Cheng | G06F 16/24535 |
| 2008/0162412 A1 * | 7/2008 | Ireland | G06F 16/24552 |
| 2010/0005077 A1 * | 1/2010 | Krishnamurthy | G06F 16/24542 707/E17.136 |
| 2015/0112965 A1 * | 4/2015 | Tokuda | G06F 16/24553 707/718 |

(Continued)

OTHER PUBLICATIONS

U.S. Appl. No. 17/462,121, filed Aug. 31, 2021, Ouyang.

(Continued)

*Primary Examiner* — Belix M Ortiz Ditren
(74) *Attorney, Agent, or Firm* — Fish & Richardson P.C.

(57) ABSTRACT

The present disclosure involves systems, software, and computer implemented methods for processing correlated calculated fields in correlated subqueries. One example method includes receiving a request to process a database query that includes at least one subquery and processing each subquery. A determination is made as to whether each subquery includes a correlated calculated field that is a calculated field that is not included in a first datasource queried by the subquery but is included in a second datasource queried by an outer query that includes the subquery. If the subquery does not include a correlated calculated field, the subquery is processed without modification. If the subquery includes a correlated calculated field, metadata is retrieved for the outer query of the subquery that queries the second datasource and includes the correlated calculated field. The subquery is rewritten using the metadata and the rewritten subquery is processed.

20 Claims, 4 Drawing Sheets

(56) References Cited

U.S. PATENT DOCUMENTS

| | | | |
|---|---|---|---|
| 2015/0142775 A1* | 5/2015 | Kang | G06F 16/24544 707/714 |
| 2018/0107832 A1 | 4/2018 | Ouyang et al. | |
| 2020/0301901 A1 | 9/2020 | Hao et al. | |
| 2023/0289342 A1* | 9/2023 | Sun | G06F 16/24528 |

OTHER PUBLICATIONS

Peruzal.com [online], "Calculated Fields" Jul. 2018, retrieved on Oct. 25, 2022, retrieved from URL <https://guides.peruzal.com/introduction-to-sql/calculated-fields/>, 1 page.

W3resource.com [online], "SQL Subqueries" Aug. 19, 2022, retrieved on Oct. 25, 2022, retrieved from URL <https://www.w3resource.com/sql/subqueries/understanding-sql-subqueries.php>, 13 pages.

* cited by examiner

302 — 300

304 — create schema SCHMA1;

306, 310, 312
308 — CREATE TABLE SCHMA1.T1 (A INT, B INT, C INT, CAL BIGINT AS MOD (B,C));

314
316 — create schema SCHMA2;

318
320 — CREATE TABLE SCHMA2.T2 (D INT, E INT, F INT);

326
322 — select B, (select D* avg(C) from T2) from T1 group by B;
              324  330
                    332
328 — select B, (select D*avg(CAL) from SCHMA2.T2) from SCHMA1.T1 group by B;

336
334 — select B, (select D*avg(MOD(SCHMA1.T1.B, SCHMA1.T1.C) ) from SCHMA2.T2) from SCHMA1.T1 group by B;

FIG. 3

PROCESSING CORRELATED CALCULATED FIELDS IN CORRELATED SUBQUERIES

TECHNICAL FIELD

The present disclosure relates to computer-implemented methods, software, and systems for processing correlated calculated fields in correlated subqueries.

BACKGROUND

Queries that are executed in a database can include one or more calculated fields. A calculated field is a field whose value can be obtained based on a calculation that involves value(s) of one or more other existing fields. A calculated field, therefore, can generate a value that is not actually stored in the database.

SUMMARY

The present disclosure involves systems, software, and computer implemented methods for processing correlated calculated fields in correlated subqueries. An example method includes: receiving a request to process a database query that includes at least one subquery; processing each subquery included in the database query, including: determining whether the subquery includes a correlated calculated field, wherein a correlated calculated field is a calculated field that is not included in a first datasource queried by the subquery but is included in a second datasource queried by an outer query that includes the subquery; in response to determining that the subquery does not include a correlated calculated field, processing the subquery without modification; and in response to determining that the subquery includes a correlated calculated field: identifying the outer query of the subquery that queries the second datasource that includes the correlated calculated field; retrieving metadata associated with the outer query and the correlated calculated field; rewriting the subquery using the metadata to generate a rewritten subquery; and processing the rewritten subquery.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a diagram that illustrates an example of processing a correlated calculated field.

DETAILED DESCRIPTION

Figure 1:
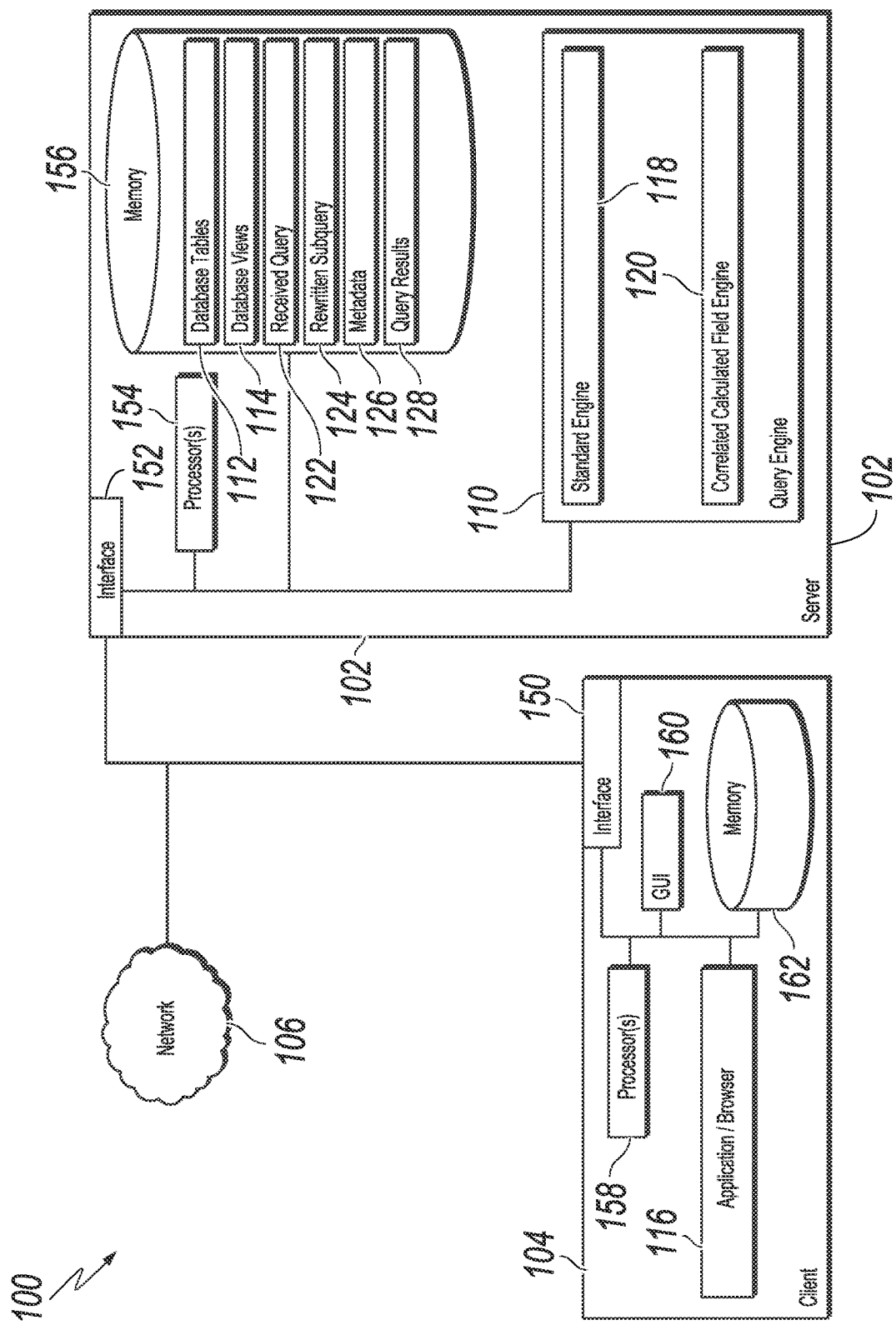
FIG. 1 is a block diagram illustrating an example system for processing correlated calculated fields in correlated subqueries.

As mentioned above, database queries may include a calculated field whose value can be obtained based on a calculation that involves value(s) of one or more other existing fields that exist in a data source (e.g., database table or view) being queried. Database queries can also be nested, with an inner query that is nested inside an outer query considered as a subquery of the outer query. A subquery can include a reference to a field of the outer query. The subquery can be considered as a correlated subquery based on using a value of a field that is queried by the outer query.

If the subquery includes a calculated field included in the data source being queried by the outer query, the calculated field reference in the subquery can be referred to as a correlated calculated field. Application developers may desire to use such queries for some applications or problem contexts, for example. However, by default, some database systems may not support correlated calculated fields in database queries.

To provide a solution for database systems that do not support correlated calculated fields, a modified query engine can pre-process queries to determine whether any subquery includes a correlated calculated field. If a subquery has a correlated calculated field, the modified query engine can replace the correlated calculated field with a different expression before the query is processed. For example and as described in more detail below, the modified query engine can identify an outer query to which the correlated calculated field belongs. Metadata for the outer query can be retrieved and used to create a query parser expression as a replacement for the calculated field reference in the subquery. The subquery can be rewritten to include the query parser expression, for example. The query that now includes a rewritten subquery can be processed by the modified query engine, rather than the original query. If an original query does not include any subqueries that have a correlated calculated field, the original query can be processed without modification.

Enhancing a database system to support correlated calculated fields can provide various technical advantages. The enhanced database system can now accept and handle queries that have correlated calculated fields. Accordingly, applications or programs that include queries with correlated calculated fields can successfully integrate with the database system without needing any modification of application code. The database system can therefore be backwards compatible with any application that includes queries with correlated calculated fields. Additionally, the database system can support future application development for applications for which correlated calculated field(s) in queries is a most efficient solution for different application use cases. Existing and new application code need not be aware that an enhancement has been made to the database system to support correlated calculated fields. From applications' perspectives, the database system supports correlated calculated fields as a standard built-in feature. An enhanced database system that supports correlated calculated fields can provide a technical advantage over other (e.g., competitor) database systems that do not support correlated calculated fields. For example, application code may need to be rewritten to work with such database systems.

FIG. 1 is a block diagram illustrating an example system 100 for processing correlated calculated fields in correlated subqueries. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A server 102 (e.g., a database server) includes a query engine 110. The query engine 110 can process received queries against database artifacts such as database tables 112, database views 114, etc. The query engine 110 can process queries based on requests received from an application/browser 116, from internal server processes, or other types of requests. A standard engine 118 of the query engine 110 may not be configured to handle correlated calculated fields. In order to handle correlated calculated fields, the standard engine 118 can be enhanced by a correlated calculated field engine 120.

The correlated calculated field engine 120 can pre-process queries before queries are handled by the standard engine 118, for example. The correlated calculated field engine 120 can determine whether a received query 122 includes a subquery that includes a correlated calculated field. If a subquery does not include a correlated calculated field, the correlated calculated field engine 120 can pass the received subquery as-is to the standard engine 118 for normal query processing. If the received query 122 includes a subquery with a correlated calculated field, the correlated calculated field engine 120 can rewrite the subquery and pass a rewritten subquery 124 on to the standard engine 118 for processing, in place of the original subquery.

For example, the correlated calculated field engine 120 can retrieve metadata 126 and use the metadata 126 to create the rewritten subquery 124. The metadata 126 can include query parser information about an outer query that includes a calculated field that is referenced in the subquery and information about an operation used for the calculated field. The rewritten subquery 124 can be rewritten to remove the correlated calculated field reference and instead explicitly include the operation and explicit references to fields of a datasource queried by the outer query. Subquery rewriting is described in more detail below. When the standard engine 118 has processed all original and rewritten subqueries, the query engine 110 can provide query results 128 for the received query 122 to a requestor who provided the received query 122.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application/browser 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application/browser 116. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
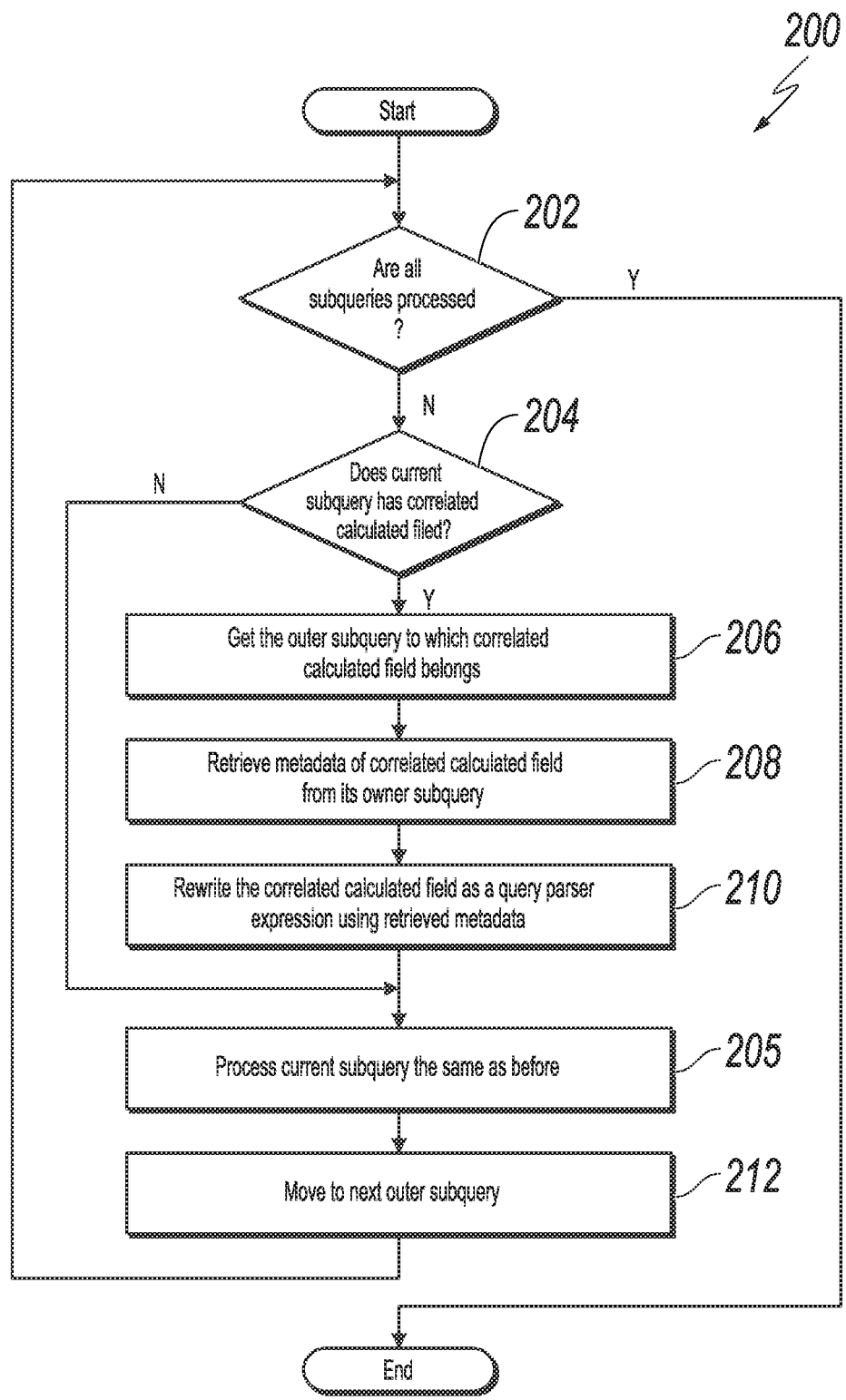
FIG. 2 is a flowchart of example process.

FIG. 2 is a flowchart of example process 200. The process 200 involves processing subqueries of a query. Subqueries can be processed by identifying subqueries in a query and then processing subqueries by processing innermost subqueries first that have a highest level of nesting and then moving outwards to any other subqueries that have a lesser amount of nesting.

At 202, a determination is made as to whether all subqueries of the query have been processed. The query may have no subqueries for example, or the query may have one or more subqueries.

At 204, in response to determining that not all subqueries of the query have been processed, a determination is made as to whether a current subquery has a correlated calculated field. As mentioned, queries with a higher amount of nesting can be processed first. For instance, in a first iteration, the current subquery may be an innermost query having a highest level of nesting.

At 205, in response to determining that the current subquery does not have a correlated calculated field, the current subquery is processed. For example, a query engine can process the current subquery without modification.

At 206, in response to determining that the current subquery has a correlated calculated field, an outer query to which the correlated calculated field belongs is identified. For example, an adjacent outer query can be searched first to determine whether the adjacent outer query queries a data source that includes the correlated calculated field. If the adjacent outer query queries a data source that includes the correlated calculated field, the adjacent outer query can be identified as an owner subquery of the correlated calculated field. If the adjacent outer query does not query a data source that includes the correlated calculated field, a next outer query (e.g., a query adjacent to the adjacent query) can be searched to locate which subquery owns the correlated calculated field.

At 208, metadata of the correlated calculated field is retrieved from an owner subquery of the correlated calculated field.

At 210, the correlated calculated field is rewritten in the current subquery as a query parser expression by using the retrieved metadata. FIG. 3 below includes an example of creating a query parser expression. The current subquery is then processed (e.g., at step 205).

At 212, processing of the query continues by identifying a next outer subquery, if an outer subquery exists. The determination at 202 can including determining whether an outer subquery exists. If all subqueries of the query have been processed, the process 200 can end.

FIG. 3 is a diagram 300 that illustrates an example of processing a correlated calculated field. A first schema SCHMA1 302 can be created in response to execution of a first schema creation statement 304. A first table T1 306 can be created under the first schema SCHMA1 304 in response to execution of a first create table statement 308. The first table T1 306 includes a calculated field CAL 310 whose value is determined from a MOD (modulus) operation 312 using other fields (e.g., fields B and C) included in the first table T1 306.

A second schema SCHMA2 314 can be created in response to execution of a second schema creation statement 316. A second table T2 318 can be created under the second schema SCHMA2 314 in response to execution of a second create table statement 320.

A first query 322 that queries the first table T1 includes a first subquery 324 that queries the second table T2. The first subquery 324 is a correlated subquery because it uses a value (e.g., C 326) from the first table T1 table specified in the outer first query 322.

A second query 328 also includes a subquery (e.g., a second subquery 330) that queries the second table T2. The second subquery 330 is also a correlated subquery because it uses a value (e.g., a CAL value 332) from the T1 table specified in the outer second query 328. The CAL value 332 in the inner second subquery 330 is a correlated calculated field (e.g., a calculated field in an inner subquery that is included in a table included in an outer query).

Some database systems may not support a correlated calculated field in a subquery. However, the process 200 described above (and/or the process 400 described below) can be applied when processing the subquery. For example, a query engine can determine, when processing the second subquery 330 and by examining metadata associated with the second table T2, that the second table T2 has no column named "CAL". The query engine can evaluate outer queries to find a CAL column, starting with most adjacent queries. For example, the query engine can determine, by evaluating metadata for the first table T1, that the first table T1 specified in the second query 328 (e.g., with the second query 328 being an outer query to the second subquery 330) has a CAL column as a calculated field. As shown in a rewritten query 334, the query engine can rewrite (e.g., replace) the CAL value 332 in the second subquery 330 with a query parser expression 336 of "MOD(SCHMA1.T1.B, SCHMA1.T1.C)" according to metadata for the CAL table defined in the first table T1. The query parser expression 336 corresponds to the MOD operation 312 but includes explicit references to columns in the first table T1 306 in the first schema 302, in place of the previous unqualified CAL value 332.

The query engine can execute the rewritten query 334 rather than the second query 328, in response to detection of and handling of the correlated calculated field. Accordingly, the database engine can now handle and process correlated calculated fields, even when the database engine was previously not configured to handle correlated calculated fields.

Figure 4:
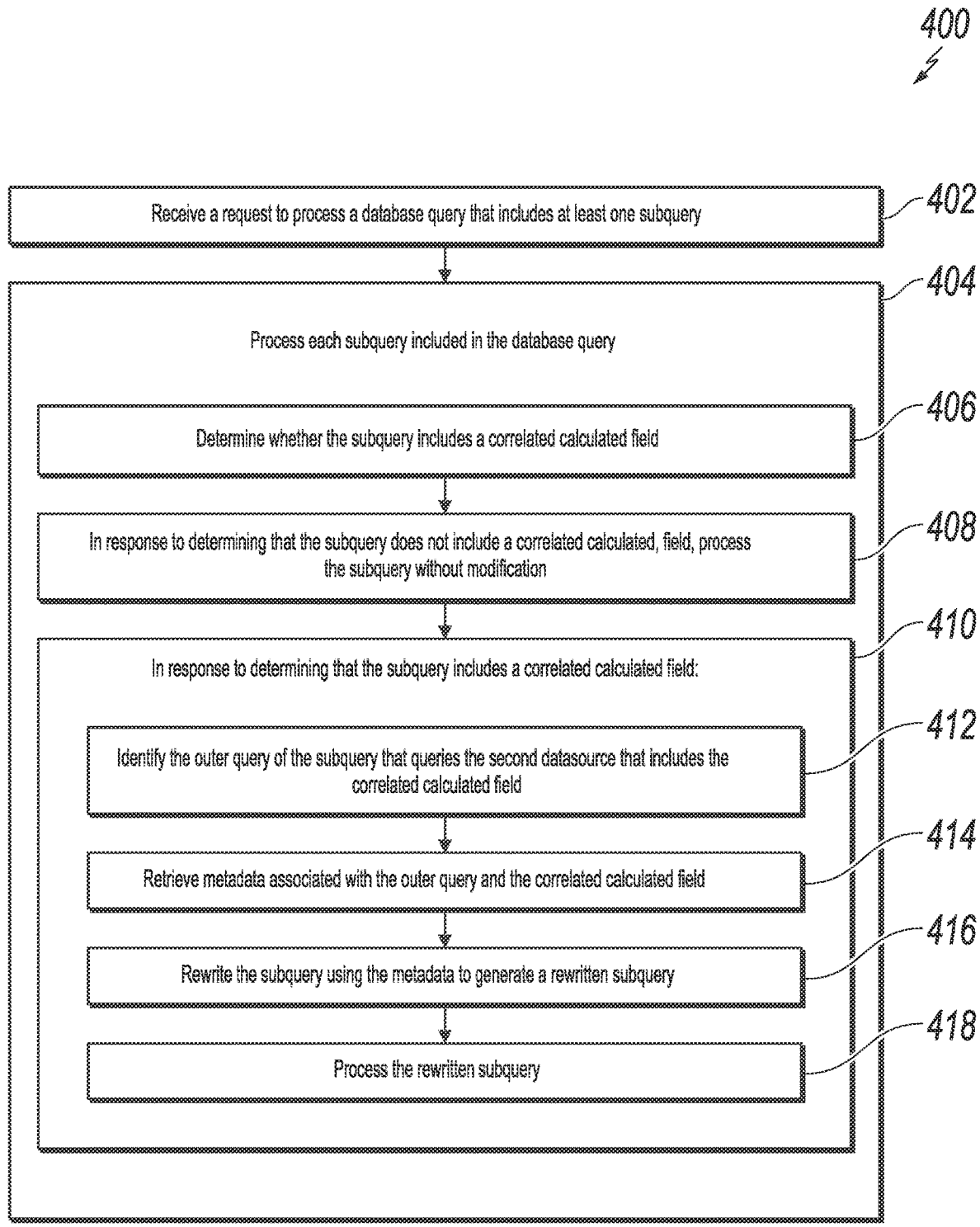
FIG. 4 is a flowchart of an example method for processing correlated calculated fields in correlated subqueries.

FIG. 4 is a flowchart of an example method for processing correlated calculated fields in correlated subqueries. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the correlated calculated field engine 120 of FIG. 1.

At 402, a request is received to process a database query that includes at least one subquery.

At 404, each subquery included in the database query is processed.

Processing each subquery can include multiple steps.

At 406, a determination is made as to whether the subquery includes a correlated calculated field. A correlated calculated field is a calculated field that is not included in a first datasource queried by the subquery but is included in a second datasource queried by an outer query that includes the subquery. The correlated calculated field can include an operation involving at least one field of the second datasource.

At 408, in response to determining that the subquery does not include a correlated calculated field, the subquery is processed (e.g., by a query engine) without modification.

At 410, in response to determining that the subquery includes a correlated calculated field, multiple steps are performed to rewrite the subquery.

At 412, an outer query of the subquery is identified, where the outer query queries the second datasource that includes the correlated calculated field. The outer query may be an immediately-adjacent query to the subquery. As another example the outer query might not be an immediately-adjacent query to the subquery and identifying the outer query can include evaluating multiple levels of outer queries of the subquery to identify the outer query.

At 414, metadata associated with the outer query and the correlated calculated field is retrieved. The metadata can include information about the operation and schema and datasource qualifications for each field of the second datasource involved in the operation.

At 416, the subquery is rewritten using the metadata to generate a rewritten subquery. Rewriting the subquery using the metadata can involve including the operation in the subquery. Rewriting the subquery using the metadata can include qualifying, in the rewritten subquery, each field of the second datasource involved in the operation with respective schema and datasource qualifications.

At 418 the rewritten subquery is processed (e.g., instead of processing the original subquery). The database query can include multiple subqueries that include respective correlated calculated fields. Processing each subquery can include rewriting each subquery of the multiple subqueries that includes a respective correlated calculated field.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving a request to process a database query that includes at least one subquery; and
   processing each subquery included in the database query, including:
   determining whether the subquery includes any correlated calculated fields, wherein a correlated calculated field is a calculated field that is not included in a first datasource queried by the subquery but is included in a second datasource queried by an outer query that includes the subquery;

in response to determining that the subquery does not include any correlated calculated fields, processing the subquery without modification; and in response to determining that the subquery includes a first correlated calculated field:
identifying the outer query of the subquery that queries the second datasource that includes the first correlated calculated field;
retrieving metadata associated with the outer query and the first correlated calculated field;
rewriting the subquery using the metadata to generate a rewritten subquery that no longer includes the first correlated calculated field; and
processing the rewritten subquery.

2. The computer-implemented method of claim 1, wherein the first correlated calculated field includes an operation involving at least one field of the second datasource.

3. The computer-implemented method of claim 2, wherein the metadata includes information about the operation and schema and datasource qualifications for each field of the second datasource involved in the operation.

4. The computer-implemented method of claim 3, wherein rewriting the subquery using the metadata comprises including the operation in the subquery.

5. The computer-implemented method of claim 4, wherein rewriting the subquery using the metadata comprises qualifying, in the rewritten subquery, each field of the second datasource involved in the operation with respective schema and datasource qualifications.

6. The computer-implemented method of claim 1, wherein the database query includes multiple subqueries that include respective correlated calculated fields.

7. The computer-implemented method of claim 6, wherein processing each subquery includes rewriting each subquery of the multiple subqueries that includes a respective correlated calculated field.

8. The computer-implemented method of claim 1, wherein the outer query is an immediately-adjacent query to the subquery.

9. The computer-implemented method of claim 1, wherein the outer query is not an immediately-adjacent query to the subquery and identifying the outer query comprises evaluating multiple levels of outer queries of the subquery to identify the outer query.

10. A system comprising:
one or more computers; and
a computer-readable medium coupled to the one or more computers having instructions stored thereon which, when executed by the one or more computers, cause the one or more computers to perform operations comprising:
receiving a request to process a database query that includes at least one subquery; and
processing each subquery included in the database query, including:
determining whether the subquery includes any correlated calculated fields, wherein a correlated calculated field is a calculated field that is not included in a first datasource queried by the subquery but is included in a second datasource queried by an outer query that includes the subquery;
in response to determining that the subquery does not include any correlated calculated fields, processing the subquery without modification; and
in response to determining that the subquery includes a first correlated calculated field:
identifying the outer query of the subquery that queries the second datasource that includes the first correlated calculated field;
retrieving metadata associated with the outer query and the first correlated calculated field;
rewriting the subquery using the metadata to generate a rewritten subquery that no longer includes the first correlated calculated field; and
processing the rewritten subquery.

11. The system of claim 10, wherein the first correlated calculated field includes an operation involving at least one field of the second datasource.

12. The system of claim 11, wherein the metadata includes information about the operation and schema and datasource qualifications for each field of the second datasource involved in the operation.

13. The system of claim 12, wherein rewriting the subquery using the metadata comprises including the operation in the subquery.

14. The system of claim 13, wherein rewriting the subquery using the metadata comprises qualifying, in the rewritten subquery, each field of the second datasource involved in the operation with respective schema and datasource qualifications.

15. The system of claim 10, wherein the database query includes multiple subqueries that include respective correlated calculated fields.

16. A computer program product encoded on a non-transitory storage medium, the product comprising non-transitory, computer readable instructions for causing one or more processors to perform operations comprising:
receiving a request to process a database query that includes at least one subquery; and
processing each subquery included in the database query, including:
determining whether the subquery includes any correlated calculated fields, wherein a correlated calculated field is a calculated field that is not included in a first datasource queried by the subquery but is included in a second datasource queried by an outer query that includes the subquery;
in response to determining that the subquery does not include any correlated calculated fields, processing the subquery without modification; and
in response to determining that the subquery includes a first correlated calculated field:
identifying the outer query of the subquery that queries the second datasource that includes the first correlated calculated field;
retrieving metadata associated with the outer query and the first correlated calculated field;
rewriting the subquery using the metadata to generate a rewritten subquery that no longer includes the first correlated calculated field; and
processing the rewritten subquery.

17. The computer program product of claim 16, wherein the first correlated calculated field includes an operation involving at least one field of the second datasource.

18. The computer program product of claim 17, wherein the metadata includes information about the operation and schema and datasource qualifications for each field of the second datasource involved in the operation.

19. The computer program product of claim 18, wherein rewriting the subquery using the metadata comprises including the operation in the subquery.

20. The computer program product of claim 19, wherein rewriting the subquery using the metadata comprises qualifying, in the rewritten subquery, each field of the second datasource involved in the operation with respective schema and datasource qualifications.

* * * * *